(No Model.) 2 Sheets—Sheet 1.
P. DIEHL.
SELF EXCITING ALTERNATE CURRENT ELECTRIC GENERATOR.
No. 503,581. Patented Aug. 22, 1893.
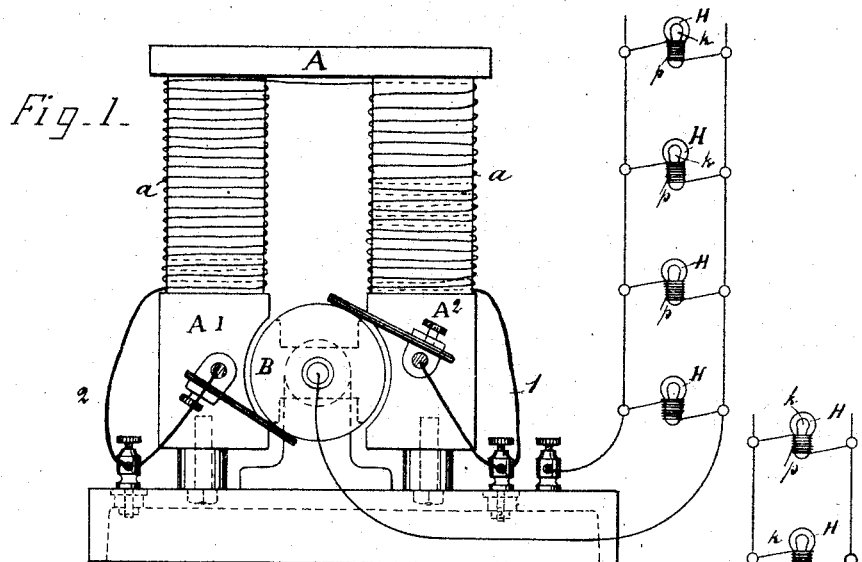
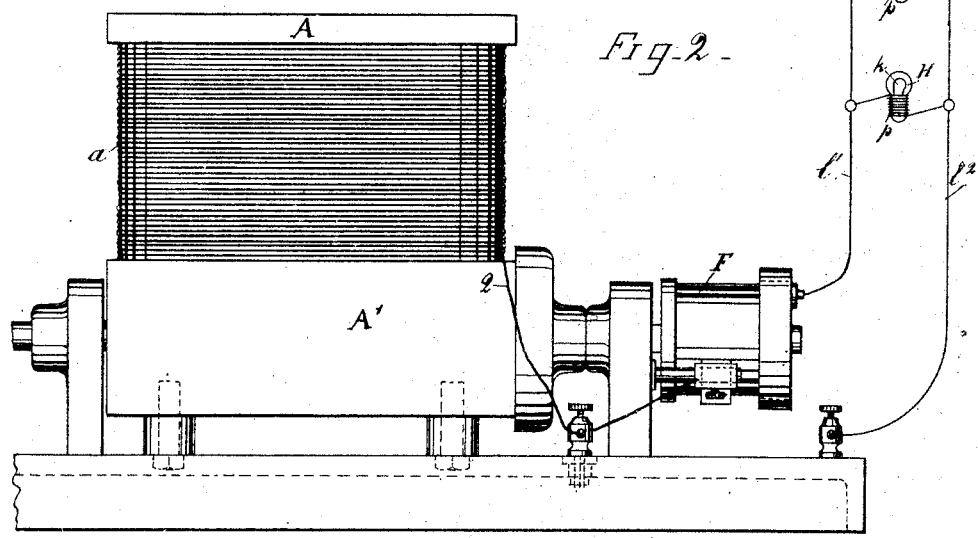
WITNESSES:
James V. Greene
L. B. Miller
INVENTOR
Philip Diehl (No Model.) 2 Sheets—Sheet 2.

P. DIEHL.
SELF EXCITING ALTERNATE CURRENT ELECTRIC GENERATOR.

No. 503,581. Patented Aug. 22, 1893.

WITNESSES:
James L. Greene
L. B. Miller.

INVENTOR
Philip Diehl

UNITED STATES PATENT OFFICE.

PHILIP DIEHL, OF ELIZABETH, NEW JERSEY, ASSIGNOR TO THE WESTINGHOUSE ELECTRIC AND MANUFACTURING COMPANY, OF PITTSBURG, PENNSYLVANIA.

SELF-EXCITING ALTERNATE-CURRENT ELECTRIC GENERATOR.

SPECIFICATION forming part of Letters Patent No. 503,581, dated August 22, 1893.

Application filed April 11, 1887. Serial No. 234,331. (No model.)

*To all whom it may concern:*

Be it known that I, PHILIP DIEHL, a citizen of the United States, residing at Elizabeth, in the county of Union and State of New Jersey, have invented certain new and useful Improvements in Self-Exciting Alternate-Current Electric Generators, of which the following is a specification, reference being had to the accompanying drawings.

The invention relates to the class of apparatus employed for generating and delivering alternate electric currents, and the object of the invention is to provide means for maintaining the field-of-force of such a generator by the currents derived from the machine itself.

The invention consists in generating and deriving from the armature, alternating electric currents and in rectifying or rendering continuous a portion of the currents and causing such rectified currents to traverse the field-magnet coils of the generator.

The invention will be described more particularly in connection with the accompanying drawings, in which—

Figure 3:
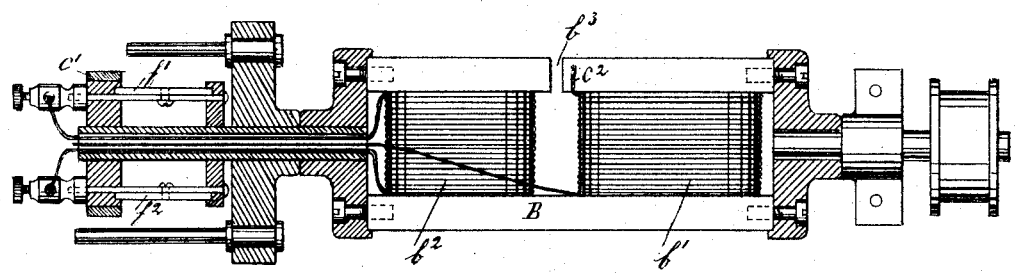
Figure 4:
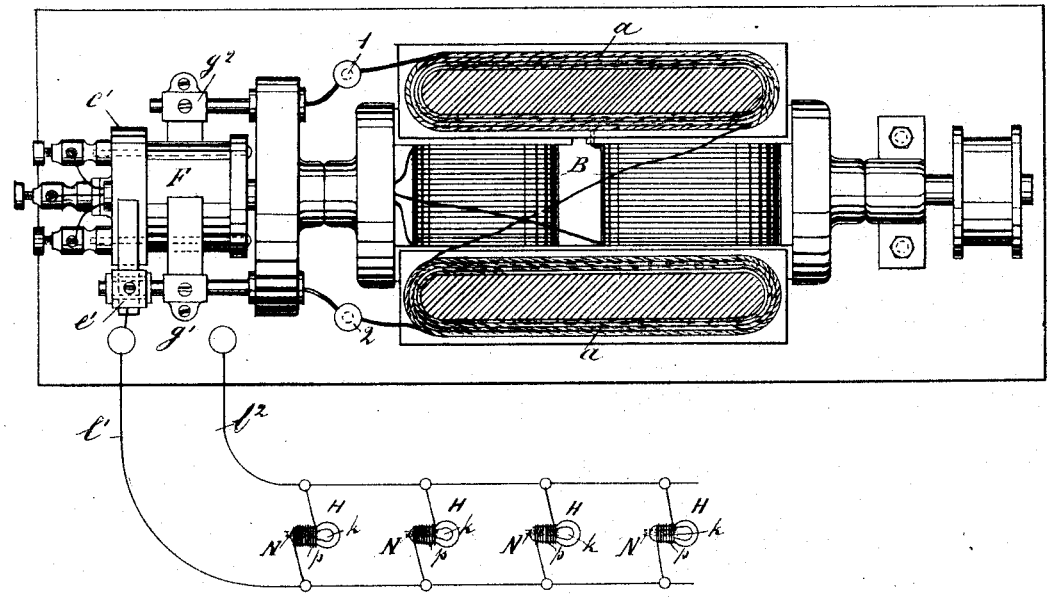

Figure 1 is an end view and Fig. 2 a side view of a machine adapted to carry out the invention. Fig. 3 is a longitudinal section of a portion of the machine showing the armature in full, and Fig. 4 is a longitudinal section of the machine.

Referring to the drawings, A represents the field-magnet of the generator, and this is provided with two poles $A'$ and $A^2$ presented to an armature B. The field-magnet is wound with coils $a$, $a$, of insulated wire. The armature consists of a core of soft-iron, of the general form known as the Siemens armature, but having a portion of its metal cut away upon one side as shown at $b^3$, to permit it to be readily wound with two bobbins $b'$, $b^2$. The bobbin $b'$ has one terminal connected to the ring $c'$ and the other in electric connection with the base of the machine through the metal $c^2$ and the bearings of the armature. The terminal $c^2$ might be connected to a second contact ring similar to $c'$. The bobbin $b^2$ has its respective terminals connected with the commutator plates $f'$, $f^2$, of a commutator F provided with collecting brushes $g'$ $g^2$. The commutator is of any well-known construction for rendering continuous in direction the currents delivered to it. It is constructed so that for each alternation in the direction of the current generated, the plates $f'$, $f^2$, will be reversed with reference to the brushes $g'$, $g^2$. The brushes $g'$, $g^2$, are connected by conductors 1 and 2 through the coils $a$, $a$, of the field-magnet, to which they deliver currents continuous in direction; such currents will serve to excite the field-magnet and maintain the field-of-force for the generator.

The currents leaving by the brush $e'$ and the base of the machine will be alternating and serve to operate translating devices, such for instance, as one or more incandescent electric lamps, as shown at H, H.

It is usually desirable to construct the two bobbins or generating circuits $b'$, $b^2$, of different sizes, the bobbin $b^2$ being the shorter and adapted to deliver currents of a lower potential than the bobbin $b'$, or of a potential best suited to the purpose of maintaining the field of force.

I claim as my invention—

1. The combination with the field-magnet of an electric generator delivering alternating electric currents and its magnetizing coils, of a single armature core revolved within the field-of-force created by such field-magnets, two coils wound thereon adapted to revolve simultaneously in the same field and means for rendering continuous a portion of the currents generated and transmitting the same through said magnetizing coils.

2. The combination with the field-magnet of an electric generator, its armature core, two sets of coils carried thereby, and adapted to revolve simultaneously in the same field and means for revolving the same within the field of said field-magnet, thereby generating alternating electric currents, of means for rectifying a portion of the currents thus generated, circuit-connections causing such rectified currents to traverse the field-magnet coils, and translating devices operated by the alternating currents.

3. The combination with the field-magnet coils of an electric generator, of an armature constructed with two bobbins of insulated wire, adapted to revolve simultaneously in the same field a commutator with the respective plates of which the terminals of one bobbin are connected, and collecting-plates with which the respective terminals of the other bobbin are connected.

4. The combination with the field-magnet coils of an electric generator, of an armature constructed with two generating circuits, adapted to revolve simultaneously in the same field a commutator with the respective plates of which the terminals of one generating circuit are connected, collecting-plates with which the respective terminals of the other generating circuit are connected and circuit-connections from said commutator through the coils of the field-magnet.

5. The combination in an electric generator of an armature having two circuits, adapted to revolve simultaneously in the same field one delivering alternating currents and the other continuous currents, and connections from the last-named circuit through the field-magnet coils of the generator.

In testimony whereof I affix my signature in presence of two witnesses.

PHILIP DIEHL.

Witnesses:
JAMES G. GREENE,
L. B. MILLER.